(12) United States Patent
Töpfer

(10) Patent No.: US 8,015,779 B2
(45) Date of Patent: Sep. 13, 2011

(54) PORTIONING AND PACKAGING APPARATUS AND METHOD

(75) Inventor: Klaus Töpfer, Büttelborn (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 11/466,623

(22) Filed: Aug. 23, 2006

(65) Prior Publication Data

US 2007/0180795 A1 Aug. 9, 2007

(30) Foreign Application Priority Data

Sep. 20, 2005 (DE) .......................... 10 2005 044 877

(51) Int. Cl.
  *B65B 1/36* (2006.01)
  *B65B 51/10* (2006.01)
(52) U.S. Cl. ................. 53/478; 53/503; 53/504; 53/459
(58) Field of Classification Search .................... 53/459, 53/478, 55, 502, 503, 504, 136.5
See application file for complete search history.

(56) References Cited

U.S. PATENT DOCUMENTS

| | | | | |
|---|---|---|---|---|
| 5,083,970 A | * | 1/1992 | Reutter | ............................ 452/30 |
| 5,775,985 A | | 7/1998 | Stanley et al. | |
| 6,651,705 B1 | * | 11/2003 | Topfer | ........................... 141/155 |

FOREIGN PATENT DOCUMENTS

| | | |
|---|---|---|
| DE | 26 45 714 | 11/1977 |
| DE | 30 24 509 A1 | 1/1982 |
| DE | 32 06 675 A1 | 9/1983 |
| DE | 696 18 111 T2 | 9/2002 |
| DE | 101 31 807 | 11/2002 |
| DE | 10 2005 044879 | 9/2006 |
| EP | 0 439 671 | 8/1991 |
| EP | 1 095 570 | 5/2001 |
| EP | 1 607 000 | 12/2005 |

OTHER PUBLICATIONS

EP Search Report.

* cited by examiner

*Primary Examiner* — Sameh H. Tawfik
*Assistant Examiner* — John Paradiso
(74) *Attorney, Agent, or Firm* — Hahn Loeser & Parks LLP

(57) ABSTRACT

A portioning and packaging apparatus and a portioning and packaging method. The portioning and packaging apparatus has a conveyor device for filling material which has a pump for producing a continuous volume flow, a filling tube which is connected to the conveyor device and which provides a supply of a tubular packaging case such that it can be pulled off the filling tube with the filling material which is expelled through the filling tube, a closure device which is arranged downstream of the filling tube and which locally constricts the filled packaging case to provide a tube end plait portion during the filling operation and closes a closure element around the tube end plait portion. The closure device also has a control device which produces a control signal for the constriction and closure operations on the basis of a selected portion size and the continuous volume flow and outputs it to a drive of the closure device.

19 Claims, 2 Drawing Sheets

PORTIONING AND PACKAGING APPARATUS AND METHOD

This patent application claims priority to German patent application DE 10 2005 044 877.1-27, filed Sep. 20, 2005, hereby incorporated by reference.

TECHNICAL FIELD

The invention concerns a portioning and packaging apparatus comprising a conveyor device for a filling material, a filling tube which is connected to the conveyor device and which is adapted to provide a supply of a tubular packaging case such that it can be pulled off the filling tube with the filling material which has been expelled through the filling tube (filling operation), and a closure device which is arranged downstream of the filling tube and which is adapted to locally constrict the filled packaging case to provide a tube end plait portion during the filling operation and to close a closure element around the tube end plait portion (closing operation). The invention further concerns a method which is carried out by means of such an apparatus, comprising the steps: conveying the filling material through a mouth opening of a filling tube into a tubular packaging case which is closed at one end (filling) and which is pulled off with the expulsion of filling material from a supply on the filling tube, and constricting the filled packaging case downstream of the filling tube to provide a tube end plait portion and closing a closure element around the tube end plait portion.

BACKGROUND OF THE INVENTION

Portioning and packaging apparatuses and methods, in particular for the production of sausages, have long been known. The conveyor device thereof, the so-called filling material or, briefly, filler, has a generally funnel-shaped filling and supply container for the generally liquid, pasty and/or granular filling material (sausage meat, sealing material, explosive or the like). The filling material is expelled by means of an extruder through the filling tube into the packaging case which is closed at one end and in so doing pulls it off the filling tube. A filler control system provides for accurate portioning, the filler control system actuating the extruder for conveying a predetermined portion size and then stopping it. At the beginning of what is referred to as the clipping pause in which the filler is stationary, the filler control system outputs a control pulse to a control device of the closure device, which actuates same for carrying out a selected working cycle.

The working cycle of the closure device or clip machine includes the step of engaging into the filled packaging case by means of at least two pairs of oppositely movable constriction means or displacement members in order to locally constrict the case to form a tube end plait portion. Thereafter the constriction means are typically spread axially with respect to the tubular case in order to extend the length of the tube end plait portion. Then one or two closure elements (clips) are fitted onto the tube end plait portion and shaped therearound until the case is closed with the required level of strength, by means of closure tools which are also oppositely movable (punch and die). The packaging case can be severed selectively between the two closure elements by means of a blade in order to produce individual sausages or lines of sausages of the desired length. The constriction means and the closure tools then open again and move back into their starting position (open position). The working cycle is concluded. The speed, moments in time and/or travel distances of the individual working steps can be optimally adjusted on the basis of a product selection to the nature and the diameter of the associated packaging material by an operator by means of the closure machine control system.

A second kind of closure apparatus is also known. Besides those with spreading displacement in which the displacer elements are moved axially away from each other after the constriction operation in order to extend the length of the constriction region for fitting the clips, DE 101 31 807, also published as U.S. Pat. No. 6,871,474, discloses a closure apparatus which dispenses with the formation of a tube end plait portion of increased length, to the advantage of simpler kinematics. That kind of closure apparatus can operate at a substantially higher cycle rate by virtue of the simpler kinematics.

The cycle rate however hits limits in respect of the filling device as that device cannot start and stop just as rapidly as may be desired, inter alia in dependence on the viscosity of the filling material.

SUMMARY OF THE INVENTION

The object of the invention is to increase the portioning capacity of the portioning and packaging apparatus and to make the portioning and packaging method more efficient.

According to the invention that object is attained by a portioning and packaging apparatus having the features of a conveyor device for a filling material, which has a pump for producing a continuous volume flow, a filling tube which is connected to the conveyor device and which is adapted to provide a supply of a tubular packaging case such that it can be pulled off the filling tube with the filling material which has been expelled through the filling tube (filling operation), and a closure device which is arranged downstream of the filling tube and which is adapted to locally constrict the filled packaging case to provide a tube end plait portion during the filling operation and to close a closure element around the tube end plait portion (closing operation), wherein the closure device has a control device which is adapted to produce a control signal for the constriction and closure operations on the basis of a selected portion size and the continuous volume flow and to output it to a drive of the closure device and a portioning and packaging method having the features of conveying the filling material in a continuous volume flow through a mouth opening of a filling tube into a tubular packaging case which is closed at one end (filling) and which is pulled off with the expulsion of filling material from a supply on the filling tube, and constricting the filled packaging case during the filling operation downstream of the filling tube to provide a tube end plait portion and closing a closure element around the tube end plait portion, wherein the constriction and closing operations are effected at periodic intervals calculated on the basis of a selected portion size and the continuous volume flow.

The invention is based on the realization that, with a sufficient reduction in the duration of a working cycle of the closure device the known filler can be replaced by a pump for producing a continuous volume flow. In the case of the portioning and packaging apparatus according to the invention that is made possible by virtue of the fact that the process control, in particular the setting of the portion size and portioning capacity, is implemented in a simple fashion by a control device which is associated with the closure device and which produces a control signal for the constriction and closure operations on the basis of a selected portion size and the continuous volume flow of the conveyor device and outputs it to the drive of the closure device. More precisely, on the basis of the selected portion size and the known volume flow, the control device calculates a filling time interval, after which the corresponding control signal for constriction and closure is outputted to the closure device. At the same time speed, moments in time and/or travel distances of the individual working steps of the closure procedure can be optimally set to a given product selection in known manner by means of the control device. The closure operation then intervenes in the ongoing filling operation, that is to say it is carried out without interrupting the filling operation.

That permits an increase in efficiency as the production cycle is no longer limited by the cycle of the filling device. The continuous filling procedure however means that it is also possible to save on the further time which otherwise elapses during the clipping pauses in the case of the known apparatuses. Or, conversely, the volume flow can be reduced during the discharge of filling material with the production speed remaining the same, in order for example to be easy on material. The invention therefore saves on costs for the fillers which are known to be expensive and complicated as well as efforts in terms of synchronization of the conveyor device and the subsequent closure device, as, instead of the two control devices which were hitherto provided for the filler on the one hand and the closure machine on the other hand, only one control device is required. Actuation of the conveyor device can also be kept very simple and can for example involve only switching it on and off at the beginning and at the end of a production operation and possibly adjustment of the volume flow. The control effect which is simplified by virtue of the invention also makes the situation easier for an operator and thus represents a way of avoiding sources of error. More specifically, operation of the entire portioning and packaging apparatus is now effected only by way of a single control device (man-machine interface), instead of by way of two separate control devices as hitherto.

Preferably the closure device has constriction means and closure tools which are movable in opposite relationship in pairs, wherein the constriction means and the closure tools are pivotally connected to two cranks of equal radii, which are drivable about their axes of rotation cyclically, synchronously and in the same direction from an open position into a closed position and into the open position again with respect to the constriction means and closure tools.

Such a portioning apparatus is known for example from DE 101 31 807. The comparatively reduced moved masses are accelerated and decelerated in a harmonic sinusoidal procedure by virtue of the rotation of the cranks occurring synchronously in the same direction. Those simple kinematics afford in operation substantial equalization in respect of masses and forces, which permits a high rotary speed and nonetheless very smooth running of the apparatus. Clip machines of that kind therefore have a very high level of portioning capacity.

The term closure time is used hereinafter to mean the time within the working cycle (from open position to open position) of the closure device, in which the constriction means and closure tools are in or in the proximity of the closure position. In the closure time the continuously advancing discharge of filling material cannot result in the packaging case being drawn off the filling tube. Unlike the situation with the known portioning and packaging apparatuses the filling operation is not interrupted by a clipping pause during the closure time or throughout the entire working cycle.

In order to counteract a problem due to the filling material which accumulates upstream of the constriction means due to the continuous volume flow during the closure time (which is admittedly very short), the portioning apparatus has a retaining device which is preferably arranged on the filling tube and which has a braking ring which circumferentially encloses the filling tube and is reciprocatable parallel thereto for applying a friction force to the packaging case while it is being pulled off.

By virtue of the axial mobility of the braking ring, it can deflect in opposite relationship to the expulsion direction for the filling material and thus clear a packaging volume into which filling material can be displaced in the constriction and closure operations. After the end of the closure time when the constriction means and closure tools release the packaging case again, the braking ring can move forward on the filling tube again in the material expulsion direction and in so doing strip off the filling material disposed in the previously open packaging volume into the packaging case which has then been pulled off. The braking ring can be for example driven passively by the pressure of the accumulating filling material during the retraction movement (deflection in opposite relationship to the expulsion direction) and can be conveyed back into a starting position in the forward movement thereof by a spring which is stressed in that way.

Preferably however the retaining device has a drive synchronizable with the closure device for the reciprocating movement of the braking ring.

That produces a defined deflection and return movement for the braking ring, which enhances the accuracy of the portioning procedure.

In accordance with an advantageous development the retaining device has a work storage means and downstream thereof in the force flow direction a check means which makes it possible for the drive assembly of the retaining device to be able to operate in a continuous mode of operation while the check means holds the braking ring fast at the drive output side at the desired holding point and the drive energy is deposited in the work storage means.

That serves to hold the braking ring in the retracted release position until the constriction means and closure tools, after the closure operation, have entirely or partially cleared the way again. An advantageous development provides that the drive of the retaining device has a crank transmission with a crank which is connected at the drive output side to the braking ring, wherein the crank transmission is preferably coupled at the drive side to the rotary drive for the adjoining device.

By virtue of using a single drive motor both for the closure device and also for the retaining device and the positive coupling effect which is ensured by the crank transmission, the reciprocating movements of the retaining device and the stroke movement of the constriction means (displacement elements) and the closure tools (punch and die) of the closure device are always positively coupled synchronously relative to each other, that is to say mechanically.

Preferably the speed of rotation of the rotary drive can be varied by means of the control signal and is lower in the region of the open position than in the region of the closed position. That is advantageously effected by the control device being adapted to output a control signal with which the rotary drive is actuable periodically for carrying out a working cycle.

The lower rotary speed can also include stopping the closure machine in the region of the open position. For example, a periodic control signal can provide that a working cycle involving a constant speed of rotation of the drive is triggered and the drive is thereafter stopped in the region of the open position. The periodicity of the control signal outputted by the control device depends on the filling duration for the selected size of portion. It will be appreciated that the same outcome can also be achieved with a drive speed which is variable stepwise or continuously, with or without a stop. The choice of actuation or control of the closure machine drive and thus the technical complication and expenditure can depend on the sausage product.

In a preferred embodiment the continuous volume flow is (also) adjustable.

That provides a further adjustable parameter which influences the production speed. That is advantageous if for example very different sizes of portions are produced or the filling material to be portioned involves very different flow properties. If for example very small portion sizes are selected, then the volume flow can/must be reduced to such an extent that it can always still be continuously delivered at the maximum frequency of the closure operation. Setting of the volume flow can be implemented for example by a change in the delivery of the pump or by a change in cross-section at a suitable location in the conveyor device.

The portioning and packaging apparatus preferably has a selection device connected to the control device and having input means for inputting a portion size. In a preferred development the selection device includes a product database from which a product can be selected by means of the input means.

In that way an operator can select for example a sausage product which by way of the product database is associated with a predetermined portion size and is thus fed to the control device for processing a control signal. The product database can be present for example in table form. It can be manually inputted and maintained and/or preset.

BRIEF DESCRIPTION OF THE DRAWINGS

Further features and advantages of the retaining device according to the invention are set forth in the appendance claims. They are described with reference to the accompanying Figures in the description hereinafter by means of embodiments by way of example. In the Figures:

DETAILED DESCRIPTION OF THE DRAWINGS

Figure 1:
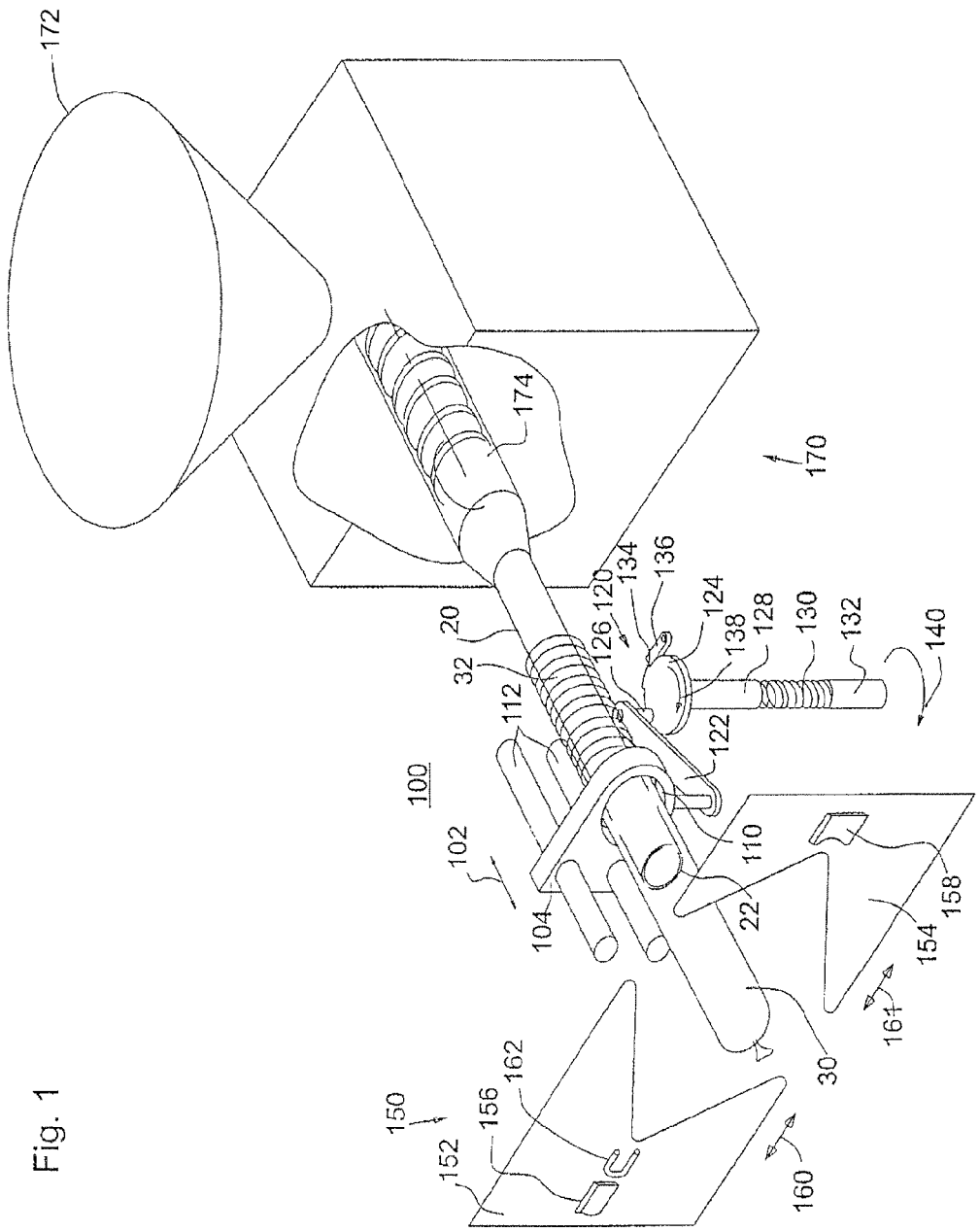
FIG. 1 is a diagrammatically simplified, perspective view of an embodiment by way of example of the portioning and packaging apparatus according to the invention.

An embodiment of the portioning and packaging apparatus of the present invention is shown in FIG. 1 for use with a filling material which is to be portioned and packaged. The filling material is fed to a pump for producing a continuous flow volume by way of an introduction opening, in the illustrated embodiment in the form of a funnel 172. The pump includes an extruder 174 which conveys the filling material continuously in the direction of a filling tube 20 adjoining the conveyor device 170 and through the mouth opening 22 thereof into a tubular packaging case 30 which is closed at one end. The packaging case 30 is pulled off a supply 32 in the form of a corrugated "skin caterpillar".

In order to control the movement of the packaging case 30 from the supply 32, a frictional resistance is applied to the packaging case 30 while it is being pulled off, by means of a retaining device 100 which is arranged on the filling tube 20 and, more precisely, by means of a braking ring 110 which circumferentially encloses the filling tube 20 and which is reciprocatable parallel thereto along the direction identified by a double-headed arrow 102. In its interior, the braking ring 110 has at least one elastic pressure ring which presses the packaging case 30 against the filling tube 20 and in that way causes a frictional force when the packaging case 30 is being pulled off.

The supply 32 of a tubular packaging case 30 can be provided either in the form of a "skin caterpillar" which is corrugated in a concertina-like configuration and which was previously (manually) pulled onto the filling tube, or in the form of a quasi-endless film tube which was folded in situ from a flat band film over the filling tube and welded or sealed. As described hereinbefore, that packaging case can be passively entrained by the discharge of filling material and/or (in an assisted mode of operation) it can be conveyed actively in the direction of flow by a drive device, for example by means of friction rollers or belts.

The braking ring 110 is accommodated in a holder 104 which is driven in the direction 102 of the linear movement. For that purpose the holder 104 is guided on two rails 112 which are oriented in parallel relationship with the filling tube 20. The drive for the reciprocating movement of the holder 104 has a crank transmission 120 which is connected at the drive output side to the holder 104 by means of a connecting rod 122. The crank transmission includes a crank disk 124 with a crank pin 126 to which the connecting rod 122 is pivotably connected. The crank disk 124 is connected to a drive output shaft 128. That in turn is driven by a drive shaft 132 by means of a coil compression spring 130, shown diagrammatically here for the sake of simplification.

Circumferentially the crank disk 124 has a projection 134 which serves as a rotation check means, together with a resiliently prestressed pawl 136. When the crank disk 124 is rotated in the direction of the arrow 138 into the illustrated position, the pawl 136 prevents the crank disk 124 from further rotation. If then the drive shaft 132 is rotated further in the drive direction indicated by the arrow 140 then that stresses the spring 130 which is incorporated as a work storage means into the flow of force from the drive shaft 132 to the braking ring holder 104. In that way the crank disk 124 and thus by way of the connecting rod 122 also the braking ring holder 104 with braking ring 110 can be stopped at a desired holding point while the drive shaft 132 can be further rotated by a drive motor.

Instead of the coil compression spring 130 between the drive shaft 132 and the drive output shaft 128, the work storage means can in principle also be arranged at any other location in the flow of force from the drive shaft to the braking ring holder 104. That can be for example in the region of the connecting rod 122. The crucial consideration in that respect is that checking of the reciprocating movement of the holder 104 is effected downstream thereof in the force flow direction, in this example accordingly the holder 104 would have to be stopped directly at a given holding point for example in the region of the rail 112.

Disposed adjoining the retaining device 100 downstream of the filling tube 20 is a closure device 150 which in FIG. 1 is illustrated in highly simplified form representatively by a pair of oppositely movable constriction means for displacement plates 152, 154 and closure tools which are oppositely movable synchronously therewith, a punch 156 and a die 158. The displacement plates 152, 154 and the closure tools 156, 158 are preferably oriented in a plane in perpendicular relationship to the filling tube and tubular case axis. The direction of movement of the constriction means and closure tools, which is identified by arrows 160, 161, is diagrammatically illustrated inclinedly relative to the horizontal plane. That direction of movement however can be any direction and can also have a pendulum movement superimposed thereon. FIG. 1 shows the closure device 150 in an open position. At their free end all displacement plates 152, 154 have a substantially triangular or V-shaped cut-out. They are respectively facing towards each other in pairs with those cut-outs. In the open position therefore the cut-outs form a rhomboidal opening arranged symmetrically around the tube or central axis. That opening is sufficiently large to allow the filled tubular case 30 to pass.

Figure 2:
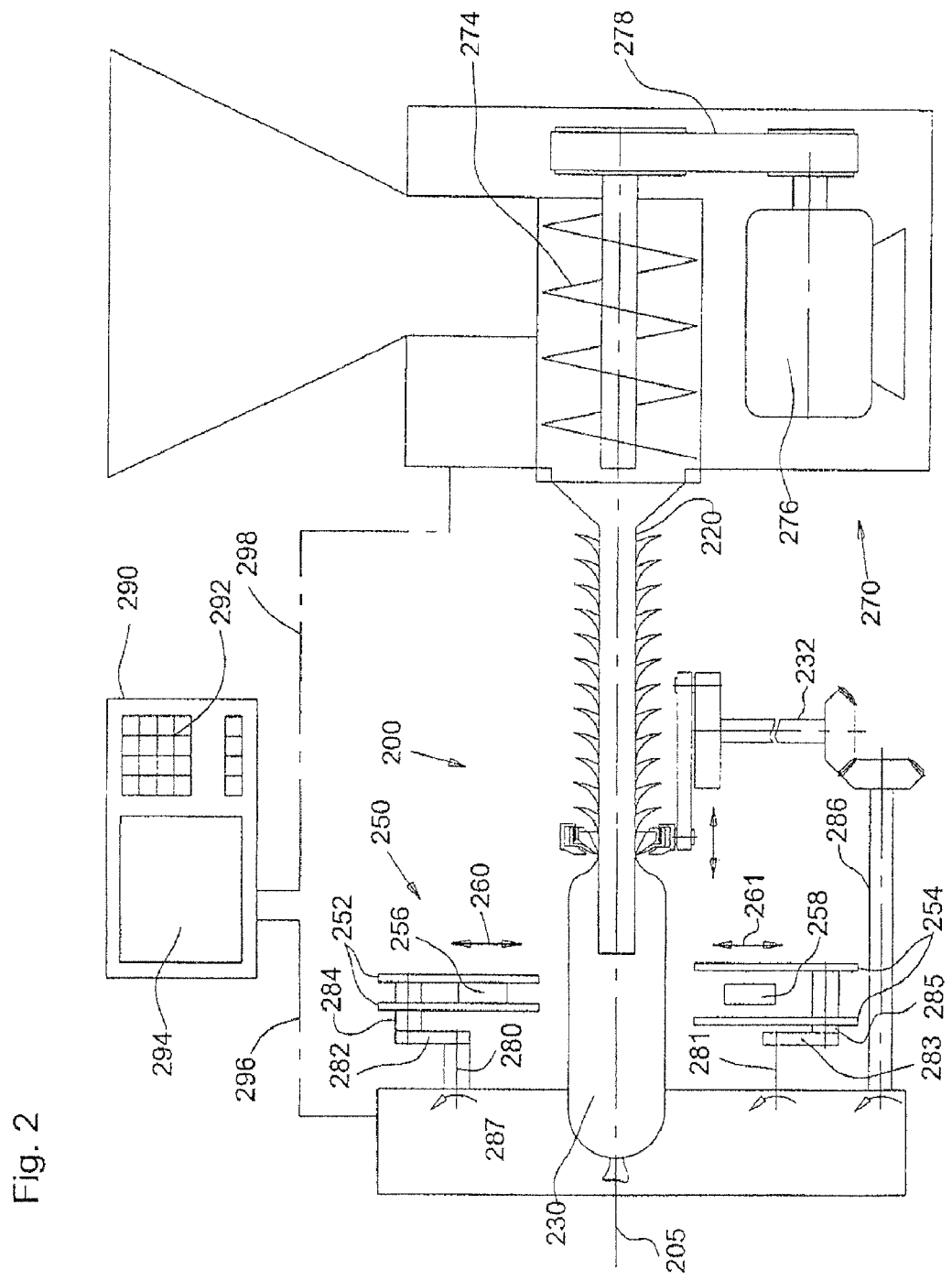
FIG. 2 is a diagrammatically simplified view of a further embodiment by way of example of the portioning and packaging apparatus according to the invention for explaining the drive control.

In actual fact the closure device does not have a pair of constriction means but a plurality of pairs of oppositely movable constriction means, as will be apparent from FIG. 2. FIG. 1 also does not give any information as to the way in which the constriction means and closure tools are driven. The drive thereof is also described in greater detail with reference to FIG. 2.

The method which is carried out by the portioning and closure apparatus shown in FIG. 1 is described hereinafter. Firstly the filling material is conveyed continuously by the extruder 174 of the conveyor device 170 through the filling tube 20 and the mouth opening 22 thereof into the tubular packaging case 30 which is closed at one end. In that case the packaging case is pulled off the supply 32 by the discharge of filling material, against the frictional force exerted by the braking ring 110 which circumferentially surrounds the filling tube.

Before the selected size of portion is attained, the braking ring 110 together with the braking ring holder 104, driven by the crank transmission 120, is retracted on the filling tube 20 in the opposite direction to the draw-off direction into a clearance position to clear a packaging volume.

While the braking ring holder 104 with the braking ring 110 is stopped in the clearance position by means of the rotational check action of the pawl 136 at least in part in time-overlapping relationship, the constriction means 152, 154 are moved towards each other into a closed position and in that situation the filling material disposed in the constriction region is displaced into the cleared packaging volume. In other words, the packaging case 30 is constricted locally to form a tube end plait portion. At the same time or in somewhat time-displaced relationship the closure tools 156, 158 are also moved towards each other into the closed position, wherein one or two closure elements 162 are deformed (in axially displaced relationship) around the tube end plait portion formed, by means of the closure tools 156, 158, until the packaging is sealingly closed. The packaging case is optionally severed between the two closure elements after the closure operation by a blade (not shown).

In a next working cycle the closure tools 156, 158 and displacement plates 152, 154 are moved away from each other again into their open position and open a larger cross-section for again filling the subsequent packaging case. In that period the rotational check action is also removed by virtue of release of the pawl 136 and freeing of the projection 134 of the crank disk 124. Freeing the crank disk 124 means that the work stored in the coil compression spring 130 drives the drive output shaft 128 with the crank disk 124 in an accelerated mode until it has followed on to the angular position, which has been further rotated in the meantime, of the drive shaft 132. In that way the holder 104 with braking ring 110 is moved into a forward position on the filling tube 20 and the filling material which has been previously displaced and accumulated in the meantime is stripped off out of the cleared volume into the next portion pack.

The holding duration (that is to say the moment of being freed) depends inter alia on the caliber size of the sausage produced and is adjusted according to experience. In that respect care is to be taken to ensure that the braking ring 110 does not move into the forward position too early, that is to say while still in the closed condition or during the opening movement of the displacement plates. Otherwise the danger threatens that the packaging case will split because the filling material which is in the clearance volume is pressed against the (partially) closed displacer elements. In contrast the holding point, that is to say the position at which the pawl is disposed or engages the crank disk is so selected that the clearance volume corresponds as exactly as possible to the volume of filling material which is displaced in the partitioning and closing procedure or which is possibly further filled in a continuous filling mode, in order to achieve a level of accuracy in respect of weight of the portions (sausages), which is as high as possible.

FIG. 2 is also a diagrammatically simplified view of an embodiment by way of example of the portioning and packaging apparatus according to the invention. It comprises the three essential devices which have already been described in greater detail with reference to FIG. 1, namely the conveyor device 270, the closure device 250 and the retaining device 200 which is reciprocatable on the filling tube 220. The conveyor device 270 has a drive motor 276 which acts by means of a transmission 278 on the extruder screw 274. The transmission can be for example a transmission involving a wrap-around transmission member and/or a gear transmission with a desired transmission ratio.

The closure device 250 has cranks 282, 283 of the same radius which are respectively mounted about an upper and a lower axis of rotation 280, 281. A respective plurality of upper and lower displacement plates 252, 254 which are axially spaced and arranged in parallel relationship are pivotably connected to the crank pins 284, 285 thereof. The displacement plates are respectively guided at their parallel straight outside edges in a guide element (not shown) which is pivotable about the tube axis 205. In that way, in the region of the tube axis, the upper and lower displacement plates perform a substantially linear opposite relative movement in their main direction of movement which is identified by double-headed arrows 260, 261. In that case they respectively co-operate in overlapping paired relationship in such a way that—in the ideal case in contact-free manner—they constrict the cross-section of the tubular case 230 and thus displace the filling material axially out of the corresponding portion of the tubular case 230.

Disposed in the axial intermediate spaces between the displacement plates 252, 254 which are each arranged on a respective crank pin 284, 286 are the closure tools which are also connected rotatably to the crank pins, being the punch 256 and the die 258. The movements of the punch and the die are thus coupled to the movement of the upper and lower displacement plates respectively.

The cranks are driven in rotation in the same direction so that superimposed on the linear relative movement is a sinusoidal pendulum movement of the overall assembly consisting of the constriction elements, closure tools and the guide element (not shown). The drive 287 for the closure device has a motor (not shown) which acts on both cranks 282, 283 in a manner which also not shown in greater detail. The motor is preferably an electric motor which is coupled to the two cranks by means of a wrap-round transmission.

The drive 287 of the closure device is additionally coupled by way of a connecting shaft 286 to the drive shaft 232 of the retaining device 200. That coupling connects the same drive motor for example to the retaining device also by way of a wrap-round transmission and/or a gear transmission and thus forms a mechanical positive coupling between the movement of the retaining device and the closure machine. Alternatively, the retaining device can also be driven by a separate motor which is synchronizable for example electronically with the drive 280 of the closure device.

Control of the portioning and packaging apparatus is effected by means of a control device 290. It includes a selection device which includes input means 292 and a display 294, by means of which an operator can make a desired product selection or can directly select a desired size of portion. Provided for the former case is a product database (data memory) which contains association information as between the product selection and the portion size. The control device 290 produces a control signal for the constriction and closure operations when, having regard to the volume flow information, the selected portion size which is directly inputted or called up from the product database is reached. It outputs the control signal to the drive 280 of the closure device 250 by way of a signal line 296. The closure device thereupon performs a working cycle and closes the packaging case while the conveyor device continues to operate.

The control device is further connected by way of a second signal line 298 to the drive of the conveyor device 270. By way thereof it receives for example information in respect of the rotary speed of the drive of the conveyor device and calculates the required information about the volume flow. That does not exclude the volume flow being variable, that is to say for example adjustable by way of a change in rotary speed. Preferably however conversely the control device outputs a control signal by way of the second signal line 298 to the drive of the conveyor device 270 and thus sets a suitable conveyor delivery or the volume flow, which is dependent on the product selection or the selected portion size. In that respect for example both the maximum working speed of the closure device 250 and also the flow property of the filling material can be taken into account. That makes operation of the apparatus particularly convenient as optimum setting of all parameters is effected solely by way of the product selection.

The invention claimed is:

1. A portioning and packaging method for filling material comprising the steps:
    conveying the filling material in a continuous volume flow through a mouth opening of a filling tube into a tubular packaging case which is closed at one end, defining a filling operation and which is pulled off with expulsion of the filling material from a supply of tubular packaging case on the filling tube, applying a friction force to the packaging case through the operation of a crank transmission, and
    constricting the filled packaging case during the filling operation downstream of the filling tube to provide a tube end plait portion and closing a closure element around the tube end plait portion with closure tools and constriction means which move in pairs in an opposite relationship, defining constriction and closure operations,
    effecting the constriction and closing operations at periodic intervals calculated on the basis of a selected portion size and the continuous volume flow, and
    reciprocating a braking ring on the filling tube in opposite relationship to the pull-off direction between a clearance position for clearing a packaging volume immediately prior to or during the constriction and closure operations and, after the closure operation, is advanced on the filling tube again in the pull-off direction, into a working position,
    stopping the braking ring in the clearance position by rotational check action of a pawl at least in time-overlapping relationship with said constriction means,
    wherein in the constriction and closure operations the filling material displaced during the constriction operation is displaced into the cleared packaging volume and after the closure operation is stripped off again into the pulled-off packaging case,
    wherein the step of conveying the filling material continues during the step of reciprocating the braking ring.

2. The method of claim 1 further comprising the step of:
    applying a friction force to the packaging case when pulling the packaging case off the filling tube by means of the braking ring which circumferentially surrounds the filling tube.

3. The method of claim 1, wherein moving braking ring back into the clearance position prior to the constriction and closure operations and holding the braking ring in the clearance position during the constriction and closure operations.

4. A portioning and packaging apparatus comprising:
    a conveyor device for a filling material, the conveyor device having a pump producing a continuous volume flow of filling material,
    a filling tube connected to the conveyor device and configured to provide a supply of a tubular packaging case that can be pulled off the filling tube by the filling material which has been expelled through the filling tube, defining a filling operation, and
    a closure device arranged downstream of the filling tube and configured to locally constrict the filled packaging case to provide a tube end plait portion during the filling operation and to close a closure element around the tube end plait portion, defining constriction and closure operations,
    a retaining device arranged on the filling tube and having a braking ring circumferentially enclosing the filling tube and reciprocating parallel thereto applying a friction force to the packaging case while the packaging case is being pulled off the filling tube,
    wherein the closure device has a control device producing a control signal for the constriction and closure operations based on a selected portion size and the continuous volume flow of filling material and outputting the control signal to a drive of the closure device, and
    wherein the braking ring reciprocates between a first position and a second position, the braking ring retracting on the filling tube in opposite relationship to the pull-off direction into a clearance position, defining the first position, clearing a packaging volume immediately prior to or during the constriction and closure operations and after the closure operation advancing on the filling tube again in the pull-off direction into a working position, defining the second position, the braking ring stopped in said clearance position by rotational check action of a pawl at least in time-overlapping relationship with said constriction means,
    wherein in the constriction and closure operations the filling material displaced during the constriction operation is displaced into the cleared packaging volume and after the closure operation is stripped off again into the pulled-off packaging case.

5. The portioning and packaging apparatus of claim 4, wherein the retaining device has a drive synchronized with the closure device for the reciprocating movement of the braking ring.

6. The portioning and packaging apparatus of claim 5, wherein the drive has a crank transmission with a crank connected to the braking ring.

7. The portioning and packaging apparatus of claim 6, wherein the crank is connected to a braking ring holder by a connecting rod.

8. The portioning and packaging apparatus of claim 4, wherein the retaining device has a work storage means and a check means between the work storage means and the braking ring for stopping the braking ring in a holding point.

9. The portioning and packaging apparatus of claim 4, wherein the control device regulates the volume flow of filling material.

10. The portioning and packaging apparatus of claim 4 further comprising a selection device connected to the control device and having input means for inputting a portion size.

11. The portioning and packaging apparatus of claim 10, wherein the selection device includes a product database from which a product can be selected by means of the input means.

12. A portioning and packaging apparatus comprising:
 a conveyor device for a filling material, the conveyor device having a pump producing a continuous volume flow of filling material,
 a filling tube connected to the conveyor device and configured to provide a supply of a tubular packaging case that can be pulled off the filling tube by the filling material which has been expelled through the filling tube, defining a filling operation, and
 a closure device arranged downstream of the filling tube and configured to locally constrict the filled packaging case to provide a tube end plait portion during the filling operation and to close a closure element around the tube end plait portion, defining constriction and closure operations,
 wherein the closure device has a control device producing a control signal for the constriction and closure operations based on a selected portion size and the continuous volume flow of filling material and outputting the control signal to a drive of the closure device, the closure device includes closure tools and constriction means moving in pairs in an opposite relationship, wherein the constriction means and the closure tools are pivotably connected to two cranks of equal radii move about their axes of rotation cyclically, synchronously and in the same direction from an open position into a closed position and back into the open position again with respect to the constriction means and the closure tools, defining a working cycle, and
 wherein the braking ring reciprocates between a first position and a second position, the braking ring retracting on the filling tube in opposite relationship to the pull-off direction into a clearance position, defining a first position, clearing a packaging volume immediately prior to or during the constriction and closure operations and after the closure operation advancing on the filling tube again in the pull-off direction into a working position, defining the second position, the braking ring stopped in said clearance position by rotational check action of a pawl at least in time-overlapping relationship with said constriction means,
 wherein in the constriction and closure operations the filling material displaced during the constriction operation is displaced into the cleared packaging volume and after the closure operation is stripped off again into the pulled-off packaging case.

13. The portioning and packaging apparatus of claim 12, wherein the drive of the closure device is a rotary drive acting on said two cranks coupled by way of a wrap-around transmission.

14. The portioning and packaging apparatus of claim 13, further comprising a retaining device arranged on the filling tube and having the braking ring thereon circumferentially enclosing the filling tube applying a friction force to the packaging case while the packaging case is being pulled off the filling tube, the retaining device having a drive synchronized with the closure device for the reciprocating movement of the braking ring wherein the retaining device has a work storage means and a check means between the work storage means and the braking ring for stopping the braking ring in a holding point, the drive has a crank transmission with a crank which is connected to the braking ring, the crank transmission of the retaining device being coupled to the rotary drive of the closure device.

15. The portioning and packaging apparatus of claim 13, wherein a rotary speed of the rotary drive varies by means of the control signal and is lower in the region of the open position than in the region of the closed position.

16. The portioning and packaging apparatus of claim 13, wherein the control device outputs a control signal periodically actuating the rotary drive for carrying out a working cycle.

17. The portioning and packaging apparatus of claim 16, wherein the closure device has a double arrangement of said closure tools and said constriction means moving in pairs in an opposite relationship and arranged such that two closure tools are synchronously applied to the tube end plait portion at a spacing from each other.

18. The portioning and packaging apparatus of claim 17 further a blade guided in a central plane of the double arrangement of said closure tools wherein the blade is switched on selectively in the working cycle in such a way that after the conclusion of the closure operation it severs the tube end plait portion between the two closure tools.

19. A portioning and packaging apparatus comprising:
 a conveyor device for a filling material, the conveyor device having a pump producing a continuous volume flow of filling material,
 a filling tube connected to the conveyor device and configured to provide a supply of a tubular packaging case that can be pulled off the filling tube by the filling material which has been expelled through the filling tube, defining a filling operation, and
 a closure device arranged downstream of the filling tube and configured to locally constrict the filled packaging case to provide a tube end plait portion during the filling operation and to close a closure element around the tube end plait portion, defining constriction and closure operations,
 a retaining device which is arranged on the filling tube and having a braking ring circumferentially enclosing the filling tube and reciprocates parallel thereto applying a friction force to the packaging case while the packaging case is being pulled off the filling tube, the retaining device has a drive synchronizing with the closure device for the reciprocating time-overlapping movement of the braking ring by means of rotational check action of a pawl,
 wherein the closure device has a control device producing a control signal for the constriction and closure operations based on a selected portion size and the continuous volume flow of filling material and outputting the control signal to a drive of the closure device.

* * * * *

UNITED STATES PATENT AND TRADEMARK OFFICE
CERTIFICATE OF CORRECTION

PATENT NO. : 8,015,779 B2
APPLICATION NO. : 11/466623
DATED : September 13, 2011
INVENTOR(S) : Klaus Töpfer Page 1 of 1

It is certified that error appears in the above-identified patent and that said Letters Patent is hereby corrected as shown below:

Column 12, Claim 18, line 30 - replace "further a" with "further comprising a".

Signed and Sealed this
Seventeenth Day of April, 2012

David J. Kappos
*Director of the United States Patent and Trademark Office*